(12) United States Patent
Wang et al.

(10) Patent No.: US 12,176,533 B2
(45) Date of Patent: Dec. 24, 2024

(54) POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

(71) Applicant: LG Energy Solution, Ltd., Seoul (KR)

(72) Inventors: Wen Xiu Wang, Daejeon (KR); Wang Mo Jung, Daejeon (KR); Min Suk Kang, Daejeon (KR); Sang Wook Lee, Daejeon (KR); So Ra Baek, Daejeon (KR); Eun Sol Lho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 690 days.

(21) Appl. No.: 17/297,823

(22) PCT Filed: Nov. 1, 2019

(86) PCT No.: PCT/KR2019/014740
§ 371 (c)(1),
(2) Date: May 27, 2021

(87) PCT Pub. No.: WO2020/111545
PCT Pub. Date: Jun. 4, 2020

(65) Prior Publication Data
US 2022/0045322 A1    Feb. 10, 2022

(30) Foreign Application Priority Data
Nov. 30, 2018    (KR) .................. 10-2018-0152743

(51) Int. Cl.
*H01M 4/525*    (2010.01)
*H01M 4/02*    (2006.01)
*H01M 4/131*    (2010.01)
*H01M 10/0525*    (2010.01)

(52) U.S. Cl.
CPC ........... *H01M 4/525* (2013.01); *H01M 4/131* (2013.01); *H01M 10/0525* (2013.01); *H01M 2004/021* (2013.01); *H01M 2004/028* (2013.01)

(58) Field of Classification Search
CPC ................ H01M 4/525; H01M 4/131; H01M 10/0525; H01M 2004/021; H01M 2004/028; H01M 10/052; H01M 10/0567; H01M 4/38; H01M 4/463; H01M 4/485; H01M 4/505; H01M 2220/30; H01M 2300/0025; C01P 2002/52; C01P 2004/61; C01P 2006/82; C01G 53/50; Y02E 60/10
See application file for complete search history.

(56) References Cited

U.S. PATENT DOCUMENTS

| | | |
|---|---|---|
| 2007/0231691 A1 | 10/2007 | Abe et al. |
| 2011/0226986 A1 | 9/2011 | Wang et al. |
| 2012/0107687 A1 | 5/2012 | Ishida et al. |
| 2012/0282524 A1* | 11/2012 | Kono ............... H01M 4/364 429/223 |
| 2014/0106228 A1 | 4/2014 | Toya et al. |
| 2015/0280211 A1 | 10/2015 | Kikuya et al. |
| 2016/0149210 A1* | 5/2016 | Yoo .................. H01M 4/525 429/231.95 |
| 2018/0175368 A1 | 6/2018 | Zhou et al. |
| 2018/0316005 A1 | 11/2018 | Shin et al. |
| 2019/0267612 A1 | 8/2019 | Zhang et al. |
| 2019/0300382 A1 | 10/2019 | Kim et al. |
| 2020/0106095 A1 | 4/2020 | Nam et al. |

FOREIGN PATENT DOCUMENTS

| | | | | |
|---|---|---|---|---|
| CN | 102754253 | * | 10/2012 | ........... H01M 4/525 |
| CN | 104703921 A | | 6/2015 | |
| CN | 109004175 A | | 12/2018 | |
| JP | 11040154 | * | 7/1997 | ............. H01M 4/58 |
| JP | 2004111076 A | | 4/2004 | |
| JP | 2010073686 A | | 4/2010 | |
| JP | 2012506110 A | | 3/2012 | |
| JP | 2015191847 A | | 11/2015 | |
| JP | 2017041425 A | | 2/2017 | |
| KR | 20120047029 A | | 5/2012 | |
| KR | 20150042610 A | | 4/2015 | |
| KR | 20150050153 A | | 5/2015 | |
| KR | 20150071831 A | | 6/2015 | |
| KR | 2015-0073970 A | | 7/2015 | |

(Continued)

OTHER PUBLICATIONS

Extended European Search Report including Written Opinion for Application No. 19890594.5 dated Dec. 15, 2021, pp. 1-8.
Woo, S. W. et al., "Improvement of electrochemical and thermal properties of Li[Ni0.8Co0.1Mn0.1]O2 positive electrode materials by multiple metal (Al, Mg) substitution", Electrochimica Acta, Jan. 2009, pp. 3851-3856, vol. 54, Elsevier. XP026040267.
Search Report dated Aug. 7, 2023 from the Office Action for Chinese Application No. 201980078101.1 issued Aug. 8, 2023, 2 pages. [See p. 1, categorizing the cited references].
Search report from International Application No. PCT/KR2019/014740, mailed Feb. 12, 2020.

*Primary Examiner* — Helen Oi K Conley
(74) *Attorney, Agent, or Firm* — Lerner David LLP

(57) ABSTRACT

In one arrangement, the present disclosure relates to a positive electrode active material including a nickel-cobalt-manganese-based lithium transition metal oxide which contains nickel in an amount of 60 mol % or more based on a total number of moles of metals excluding lithium, wherein the nickel-cobalt-manganese-based lithium transition metal oxide is doped with doping element $M^1$ (where the doping element $M^1$ is a metallic element including Al) and doping element $M^2$ (where the doping element $M^2$ is at least one metallic element selected from the group consisting of Mg, La, Ti, Zn, B, W, Ni, Co, Fe, Cr, V, Ru, Cu, Cd, Ag, Y, Sc, Ga, In, As, Sb, Pt, Au, and Si), where the doping element $M^1$ can be in an amount of 100 ppm to 10,000 ppm, and the doping element $M^1$ and the doping element $M^2$ are included in a weight ratio of 50:50 to 99:1.

8 Claims, No Drawings

(56) References Cited

FOREIGN PATENT DOCUMENTS

| KR | 20150091183 A | 8/2015 |
|----|---------------|--------|
| KR | 20180067775 A | 6/2018 |
| KR | 20180070435 A | 6/2018 |
| KR | 20180077026 A | 7/2018 |
| KR | 20180121267 A | 11/2018 |
| WO | 2014061654 A1 | 4/2014 |

* cited by examiner

POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

CROSS-REFERENCE TO RELATED APPLICATIONS

The present application is a national phase entry under 35 U.S.C. § 371 of International Application No. PCT/KR2019/014740 filed Nov. 1, 2019, which claims the benefit of Korean Patent Application No. 10-2018-0152743, filed on Nov. 30, 2018, in the Korean Intellectual Property Office, the disclosures of which are incorporated herein in their entirety by reference.

TECHNICAL FIELD

The present disclosure relates to a positive electrode active material for a lithium secondary battery, and a positive electrode and a lithium secondary battery which include the positive electrode active material. Specifically, the present disclosure relates to a positive electrode active material in which powder hygroscopicity is reduced by doping a high nickel-containing lithium transition metal oxide with a specific doping element, and a positive electrode and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide (LiMnO2 or $LiMn_2O_4$, etc.), or a lithium iron phosphate compound (LiFePO4) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide' or 'NCA-basedlithium composite transition metal oxide') in which a portion of nickel (Ni) is substituted with cobalt (Co) or manganese (Mn)/aluminum (Al), has been developed. However, since capacity characteristics of conventionally developed NCM-based/NCA-based lithium composite transition metal oxides are insufficient, the NCM-based/NCA-based lithium composite transition metal oxides have been limited in application.

In order to address such limitation, studies have recently been made to increase a nickel (Ni) content in the NCM-based/NCA-based lithium oxides. However, with respect to a high Ni-containing NCM-based/NCA-based lithium oxide, nickel in the NCM-based/NCA-based lithium oxide is present as $Ni^{3+}$ with inferior stability as the Ni content increases. Accordingly, since the NCM-based/NCA-based lithium oxide becomes unstable and the nickel in the NCM-based/NCA-based lithium oxide reacts with moisture in the air or a solvent in the electrolyte solution to form a hydroxyl group, there has been a problem in that a large amount of moisture is present in the positive electrode active material. In addition, when using the positive electrode active material in which the large amount of moisture is present, since the hydroxyl group formed in the positive electrode active material reacts with a binder, which is included in a positive electrode active material layer, to cause gelation, uniformity of the positive electrode active material layer is reduced, and thus, there has been a problem in that a decrease in adhesion of and in the electrode may occur, capacity of a cell may not be achieved, and output may be reduced.

DETAILED DESCRIPTION OF THE PRESENT DISCLOSURE

Technical Problem

An aspect of the present disclosure provides a positive electrode active material in which moisture absorption is reduced by doping a high nickel-containing nickel-cobalt-manganese-based lithium transition metal oxide with two or more doping elements at a specific ratio.

Another aspect of the present disclosure provides a positive electrode for a lithium secondary battery which includes the positive electrode active material in which the moisture absorption is reduced.

Another aspect of the present disclosure provides a lithium secondary battery including the positive electrode for a lithium secondary battery.

Technical Solution

According to an aspect of the present disclosure, there is provided a positive electrode active material including a nickel-cobalt-manganese-based lithium transition metal oxide which contains nickel in an amount of 60 mol % or more based on a total number of moles of metals excluding lithium, wherein the nickel-cobalt-manganese-based lithium transition metal oxide is doped with doping element $M^1$ (where the doping element $M^1$ is a metallic element including aluminum (Al)) and doping element $M^2$ (where the doping element $M^2$ is at least one metallic element selected from the group consisting of magnesium (Mg), lanthanum (La), titanium (Ti), zinc (Zn), boron (B), tungsten (W), nickel (Ni), cobalt (Co), iron (Fe), chromium (Cr), vanadium (V), ruthenium (Ru), copper (Cu), cadmium (Cd), silver (Ag), yttrium (Y), scandium (Sc), gallium (Ga), indium (In), arsenic (As), antimony (Sb), platinum (Pt), gold (Au), and silicon (Si)), and the nickel-cobalt-manganese-based lithium transition metal oxide includes the doping element $M^1$ in an amount of 100 ppm to 10,000 ppm and the doping element $M^1$ and the doping element $M^2$ are included in a weight ratio ($M^1:M^2$) of 50:50 to 99:1.

According to another aspect of the present disclosure, there is provided a positive electrode including a positive electrode collector, and a positive electrode active material layer formed on the positive electrode collector, wherein the positive electrode includes the positive electrode active material according to the present disclosure.

According to another aspect of the present disclosure, there is provided a lithium secondary battery including the positive electrode according to the present disclosure.

Advantageous Effects

According to the present disclosure, hygroscopicity, in which a positive electrode active material absorbs moisture in the air, may be suppressed by doping a high nickel-containing nickel-cobalt-manganese-based lithium transition metal oxide with two or more doping elements at specific amount and ratio.

Also, the formation of a lithium by-product, such as LiOH, by a reaction of moisture with lithium, which is present on a surface of the high nickel-containing nickel-cobalt-manganese-based lithium transition metal oxide, may be reduced by suppressing the moisture hygroscopicity of the positive electrode active material.

MODES FOR CARRYING OUT THE PRESENT DISCLOSURE

Hereinafter, the present disclosure will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

Throughout this specification, the expression "average particle diameter ($D_{50}$)" may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm, and may obtain highly repeatable and high resolution results.

Positive Electrode Active Material

A positive electrode active material for a secondary battery according to the present disclosure includes a nickel-cobalt-manganese-based lithium transition metal oxide containing nickel in an amount of 60 mol % or more based on a total number of moles of metals excluding lithium, wherein the nickel-cobalt-manganese-based lithium transition metal oxide is doped with doping element $M^1$ (where the doping element $M^1$ is a metallic element including aluminum (Al)) and doping element $M^2$ (where the doping element $M^2$ is at least one metallic element selected from the group consisting of magnesium (Mg), lanthanum (La), titanium (Ti), zinc (Zn), boron (B), tungsten (W), nickel (Ni), cobalt (Co), iron (Fe), chromium (Cr), vanadium (V), ruthenium (Ru), copper (Cu), cadmium (Cd), silver (Ag), yttrium (Y), scandium (Sc), gallium (Ga), indium (In), arsenic (As), antimony (Sb), platinum (Pt), gold (Au), and silicon (Si)), the nickel-cobalt-manganese-based lithium transition metal oxide includes the doping element $M^1$ in an amount of 100 ppm to 10,000 ppm, and the doping element $M^1$ and the doping element $M^2$ are included in a weight ratio ($M^1$:$M^2$) of 50:50 to 99:1.

When the positive electrode active material is described in more detail, the nickel-cobalt-manganese-based lithium transition metal oxide according to the present disclosure contains nickel in an amount of 60 mol % or more based on a total number of moles of metals excluding lithium. In a case in which the amount of the nickel contained in the nickel-cobalt-manganese-based lithium transition metal oxide is less than the above range, since capacity of the positive electrode active material is reduced, it may not be used in an electrochemical device requiring high capacity. As the amount of the nickel is increased within the above range, a battery including the same may exhibit high capacity characteristics. However, as the amount of the nickel is increased, an amount of cobalt and/or manganese is relatively decreased, and, accordingly, charge and discharge efficiency may be reduced. Thus, the positive electrode active material contains nickel in an amount of 60 mol % or more, preferably 60 mol % to 90 mol %, more preferably 70 mol % to 90 mol %, and most preferably 80 mol % to 85 mol % based on the total number of moles of transition metal elements excluding lithium.

Also, the nickel-cobalt-manganese-based lithium transition metal oxide may contain cobalt in an amount of 0 mol % to 35 mol %, preferably 3 mol % to 20 mol %, and most preferably 5 mol % to 10 mol % based on the total number of moles of metallic elements excluding lithium. In a case in which the amount of the cobalt is outside the range and is greater than 35 mol %, the overall cost of raw materials may increase due to the large amount of the cobalt and reversible capacity may be somewhat reduced.

Furthermore, the nickel-cobalt-manganese-based lithium transition metal oxide may contain manganese in an amount of 0 mol % to 35 mol %, preferably 3 mol % to 20 mol %, and most preferably 5 mol % to 10 mol % based on the total number of moles of metallic elements excluding lithium. In a case in which the manganese is included in an amount within above range, structural stability of the active material may be improved.

Also, the nickel-cobalt-manganese-based lithium transition metal oxide is doped with the doping elements $M^1$ and $M^2$.

In this case, the doping element $M^1$ is a metallic element including Al, and the doping element $M^2$ may include at least one selected from the group consisting of Mg, La, Ti, Zn, B, W, Ni, Co, Fe, Cr, V, Ru, Cu, Cd, Ag, Y, Sc, Ga, In, As, Sb, Pt, Au, and Si, may preferably include at least one selected from the group consisting of Mg, La, and Ti, may more preferably include at least two selected from the group consisting of Mg, La, and Ti, and may most preferably include all of Mg, La, and Ti.

For example, since the nickel-cobalt-manganese-based lithium transition metal oxide includes the doping element $M^1$, the structural stability of the nickel-cobalt-manganese-based lithium transition metal oxide may be improved to suppress moisture hygroscopicity in which the positive electrode active material absorbs moisture in the air.

However, in a case in which the nickel-cobalt-manganese-based lithium transition metal oxide is only doped with the doping element $M^1$, capacity retention may be poor.

According to the present disclosure, since the nickel-cobalt-manganese-based lithium transition metal oxide is doped with the doping elements $M^1$ and $M^2$ at a specific ratio, the moisture hygroscopicity of the positive electrode active material may not only be suppressed due to the structural stability improvement, but also an effect of improving capacity characteristics may further be achieved.

For example, since the structural stability of the nickel-cobalt-manganese-based lithium transition metal oxide is improved by including the doping element $M^1$, the capacity characteristics may be improved when the nickel-cobalt-manganese-based lithium transition metal oxide is used in a battery.

The doping element $M^1$ may be included in an amount of 100 ppm to 10,000 ppm, preferably 1,000 ppm to 10,000 ppm, and most preferably 3,000 ppm to 5,000 ppm based on 100 parts by weight of a total weight of the nickel-cobalt-manganese-based lithium transition metal oxide. When the amount of the doping element $M^1$ satisfies the above range, an effect of suppressing the moisture hygroscopicity may be maximized.

For example, in a case in which the amount of the doping element $M^1$ is less than the above range, the effect of suppressing the moisture hygroscopicity of the positive electrode active material may not be achieved, and, in a case in which the amount of the doping element $M^1$ is greater than the above range, since energy density is reduced, life characteristics may be degraded when the nickel-cobalt-manganese-based lithium transition metal oxide is used in a battery.

Also, the doping elements $M^1$ and $M^2$ may be included in a weight ratio of 50:50 to 99:1, preferably 60:40 to 80:20, and most preferably 70:30 to 80:20. For example, in a case in which the doping elements $M^1$ and $M^2$ satisfy the above weight ratio range, the hygroscopicity of the positive electrode active material may be further suppressed, and the capacity characteristics may be improved when the positive electrode active material is used in a battery.

In contrast, in a case in which the weight ratio of the doping element $M^1$ to the doping element $M^2$ is outside the above range and the ratio of the doping element $M^1$ is greater than the above range, the capacity characteristics may be degraded, and, in a case in which the ratio of the doping element $M^1$ is less than the above range, the effect of suppressing the moisture hygroscopicity of the positive electrode active material due to the doping with the doping element is reduced.

Preferably, the nickel-cobalt-manganese-based lithium transition metal oxide is represented by the following Formula 1.

[Formula 1]

In Formula 1, $M^1$ is a doping element substituted at a transition metal site in the nickel-cobalt-manganese-based lithium transition metal oxide, and may be a metallic element including Al.

The nickel-cobalt-manganese-based lithium transition metal oxide includes the doping element $M^1$ and the doping element $M^2$, wherein the doping element $M^2$ is at least one metallic element selected from the group consisting of Mg, La, Ti, Zn, B, W, Ni, Co, Fe, Cr, V, Ru, Cu, Cd, Ag, Y, Sc, Ga, In, As, Sb, Pt, Au, and Si. Preferably, $M^1$ is Al and $M^2$ may include at least one metallic element selected from the group consisting of Mg, La, and Ti, and, most preferably, $M^1$ is Al and $M^2$ includes all of Mg, La, and Ti.

$1+a$ represents a molar ratio of lithium in the nickel-cobalt-manganese-based lithium transition metal oxide, and a may satisfy $0 \leq a \leq 0.3$, for example, $0 \leq a \leq 0.15$.

x represents a molar ratio of a nickel element in the nickel-cobalt-manganese-based lithium transition metal oxide, and x may satisfy $0.60 \leq x < 1$, may preferably satisfy $0.60 \leq x \leq 0.90$, may more preferably satisfy $0.70 \leq x \leq 0.90$, and may most preferably satisfy $0.80 \leq x \leq 0.85$.

y represents a molar ratio of cobalt in the nickel-cobalt-manganese-based lithium transition metal oxide, and y may satisfy $0 < y < 0.35$, for example, $0 < y \leq 0.1$.

z represents a molar ratio of manganese in the nickel-cobalt-manganese-based lithium transition metal oxide, and z may satisfy $0 < z < 0.35$, for example, $0 < z \leq 0.1$.

In a case in which x, y, and z, the molar ratios of the transition metals in the nickel-cobalt-manganese-based lithium transition metal oxide, satisfy the above ranges, a positive electrode active material having excellent energy density and high capacity characteristics may be obtained.

w represents a molar ratio of the doping element $M^1$ in the nickel-cobalt-manganese-based lithium transition metal oxide, and w may satisfy $0 < w \leq 0.01$, may preferably satisfy $0.002 \leq w \leq 0.007$, may more preferably satisfy $0.003 \leq w \leq 0.006$, and may most preferably satisfy $0.003 \leq w \leq 0.005$. In a case in which the molar ratio of the doping element $M^1$ in the nickel-cobalt-manganese-based lithium transition metal oxide satisfies the above range, a positive electrode active material having suppressed moisture hygroscopicity may be obtained.

v represents a molar ratio of the doping element $M^2$ in the nickel-cobalt-manganese-based lithium transition metal oxide, and v may satisfy $0 < v \leq 0.005$, may preferably satisfy $0.001 \leq v \leq 0.005$, may more preferably satisfy $0.002 \leq v \leq 0.004$, and may most preferably satisfy $0.002 \leq w \leq 0.003$. In a case in which the molar ratio of the doping element $M^2$ in the nickel-cobalt-manganese-based lithium transition metal oxide satisfies the above range, a positive electrode active material having improved capacity retention may be obtained.

In a case in which w and v, the molar ratios of the doping elements in the nickel-cobalt-manganese-based lithium transition metal oxide, satisfy the above ranges, $w \geq v$, and $1 \leq w/v \leq 15$, the moisture hygroscopicity may not only be suppressed, but a positive electrode active material having improved capacity retention may also be obtained.

Specifically, the nickel-cobalt-manganese-based lithium transition metal oxide represented by Formula 1 may be $Li_{1+a}[Ni_xCo_yMn_zAl_w(Mg_{v1}La_{v2}Ti_{v3})]O_2$ (where v1+v2+v3=v, and w:(v1+v2+v3)=50:50 to 99:1), but the present disclosure is not limited thereto.

With respect to the nickel-cobalt-manganese-based lithium transition metal oxide, a total amount of a lithium by-product including at least one of lithium hydroxide and lithium carbonate, which is present on a surface of the positive electrode active material after the positive electrode active material is left standing for 1 day in an environment with a relative humidity (RH) of 60% and a temperature of 25° C., may be in a range of 0.5 part by weight or less, for example, 0.1 part by weight to 0.4 part by weight based on 100 parts by weight of a total weight of the positive electrode active material.

With respect to the positive electrode active material in which the moisture hygroscopicity is suppressed by doping with the doping elements $M^1$ and $M^2$ as in the present disclosure, since a side reaction between the positive electrode active material and moisture in the air or the positive electrode active material and an electrolyte solution is reduced as the structural stability of the positive electrode active material is improved, a hydroxyl group present in the positive electrode active material is reduced, and, as a result, an amount of lithium hydroxide formed by a reaction of the hydroxyl group with lithium present on the surface of the positive electrode active material may be reduced.

Preferably, the positive electrode active material may satisfy the following Equation 1.

$$1.0 \leq (A1/A0) \leq 1.8$$ [Equation 1]

In Equation 1, A1 is an amount of lithium carbonate present on the surface of the positive electrode active material which is measured after the positive electrode active material is left standing for 1 day in an environment with a relative humidity (RH) of 60% and a temperature of 25° C., and A0 is an initial amount of lithium carbonate present on the surface of the positive electrode active material which is measured before the positive electrode active material is left standing.

For example, the amount of the lithium hydroxide formed is reduced as the moisture absorption is suppressed as described above, and, accordingly, since an amount of reaction between LiOH and $CO_2$ is also reduced, the amount of the lithium carbonate may also be reduced.

Also, the nickel-cobalt-manganese-based lithium transition metal oxide may further include a coating layer including at least one coating element selected from the group consisting of Al, Ti, W, B, fluorine (F), phosphorus (P), Mg, Ni, Co, Fe, Cr, V, Cu, calcium (Ca), Zn, zirconium (Zr), niobium (Nb), molybdenum (Mo), strontium (Sr), Sb, bismuth (Bi), Si, and sulfur (S). For example, since a contact between the nickel-cobalt-manganese-based lithium transition metal oxide represented by Formula 1 and the electrolyte solution included in the lithium secondary battery is blocked by the coating layer to suppress the occurrence of the side reaction, the life characteristics may be improved when the nickel-cobalt-manganese-based lithium transition metal oxide is used in the battery.

In a case in which the coating element is further included as described above, an amount of the coating element in the coating layer may be in a range of 100 ppm to 10,000 ppm, for example, 200 ppm to 5,000 ppm based on the total weight of the nickel-cobalt-manganese-based lithium transition metal oxide. For example, in a case in which the coating element is included in an amount within the above range based on the total weight of the nickel-cobalt-manganese-based lithium transition metal oxide, the occurrence of the side reaction with the electrolyte solution may be more effectively suppressed and the life characteristics may be more improved when the nickel-cobalt-manganese-based lithium transition metal oxide is used in the battery.

The coating layer may be formed across an entire surface of the nickel-cobalt-manganese-based lithium transition metal oxide and may be partially formed. Specifically, in a case in which the coating layer is partially formed on the surface of the nickel-cobalt-manganese-based lithium transition metal oxide, the coating layer may be formed in an area of 5% or more to less than 100%, for example, 20% or more to less than 100% of a total surface area of the nickel-cobalt-manganese-based lithium transition metal oxide.

The nickel-cobalt-manganese-based lithium transition metal oxide may have an average particle diameter ($D_{50}$) of 8 μm to 15 μm, preferably 9 μm to 14 μm, and most preferably 10 μm to 13 μm. In a case in which the average particle diameter ($D_{50}$) of the nickel-cobalt-manganese-based lithium transition metal oxide satisfies the above range, excellent electrode density and energy density may be achieved.

Method of Preparing Positive Electrode Active Material

A commercially available nickel-cobalt-manganese-based lithium transition metal oxide may be purchased and used as the positive electrode active material, or the positive electrode active material may be prepared by a method of preparing a nickel-cobalt-manganese-based lithium transition metal oxide which is known in the art.

For example, the nickel-cobalt-manganese-based lithium transition metal oxide represented by Formula 1 may be prepared by a method in which a nickel-cobalt-manganese-based precursor, a lithium raw material, a doping element $M^1$ raw material, and a doping element $M^2$ raw material are mixed and then sintered.

The nickel-cobalt-manganese-based precursor may include a nickel-manganese-cobalt hydroxide, oxyhydroxide, carbonate, or organic complex, or a doping element $M^2$-containing hydroxide, oxyhydroxide, carbonate, or organic complex. For example, the nickel-cobalt-manganese-based precursor may be $[Ni_xCo_yMn_z](OH)_2$ or $[Ni_yCo_zMn_w]O\cdot OH$, but the nickel-cobalt-manganese-based precursor is not limited thereto.

The lithium raw material may be a lithium-containing carbonate (e.g., lithium carbonate, etc.), hydrate (e.g., lithium hydroxide monohydrate ($LiOH\cdot H_2O$, etc.), hydroxide (e.g., lithium hydroxide, etc.), nitrate (e.g., lithium nitrate ($LiNO_3$), etc.), or chloride (e.g., lithium chloride (LiCl), etc.), but the lithium raw material is not limited thereto.

The doping element $M^1$ raw material may include Al-containing oxide, hydroxide, oxyhydroxide, sulfate, carbonate, halide, sulfide, acetate, or carboxylate, or a combination thereof, and, for example, may include $AlSO_4$, $AlCl_3$, Al-isopropoxide, and $AlNO_3$, but the doping element $M^1$ raw material is not limited thereto.

The doping element $M^2$ raw material may include oxide, hydroxide, oxyhydroxide, carbonate, sulfate, halide, sulfide, acetate, and carboxylate, which include at least one doping element $M^2$ selected from the group consisting of Mg, La, Ti, Zn, B, W, Ni, Co, Fe, Cr, V, Ru, Cu, Cd, Ag, Y, Sc, Ga, In, As, Sb, Pt, Au, and Si, or a combination thereof, and, for example, may include MgO, $Mg(OH)_2$, $MgSO_4$, $Mg(NO_3)_2$, $TiO_2$, and $La_2CO_3$, but the doping element $M^2$ raw material is not limited thereto.

The sintering may be performed at 600° C. to 1,000° C., for example, 700° C. to 900° C. for 5 hours to 30 hours, for example, 10 hours to 20 hours.

In a case in which the positive electrode active material includes a coating layer, after a coating raw material is added and mixed after the sintering, a process of performing a heat treatment may be further performed.

The coating raw material may be an oxide, hydroxide, oxyhydroxide, carbonate, sulfate, halide, sulfide, acetate, or carboxylate, which includes at least one element (hereinafter, referred to as a 'coating element') selected from the group consisting of Al, Ti, W, B, F, P, Mg, Ni, Co, Fe, Cr, V, Cu, Ca, Zn, Zr, Nb, Mo, Sr, Sb, Bi, Si, and S, or a combination thereof, and, for example, may be ZnO, $Al_2O_3$, $Al(OH)_3$, $AlSO_4$, $AlCl_3$, Al-isopropoxide, $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5O)_3B$, $(CH_3(CH_2)_3O)_3B$, $C_3H_9B_3O_6$, $(C_3H_7O_3)B$, $Li_3WO_4$, $(NH_4)_{10}W_{12}O_{41}\cdot 5H_2O$, and $NH_4H_2PO_4$, but the coating raw material is not limited thereto.

A method known in the art may be used for the formation of the coating layer, and, for example, a wet coating method, a dry coating method, a plasma coating method, or atomic layer deposition (ALD) may be used.

The heat treatment for the formation of the coating layer may be performed at 100° C. to 700° C., for example, 300° C. to 450° C., for 1 hour to 15 hours, for example, 3 hours to 8 hours.

Positive Electrode

Next, a positive electrode for a lithium secondary battery according to the present disclosure will be described.

The positive electrode according to the present disclosure includes a positive electrode collector, and a positive electrode active material layer formed on the positive electrode collector, wherein the positive electrode active material layer includes the positive electrode active material according to the present disclosure and includes a conductive agent and/or a binder, if necessary.

In this case, since the positive electrode active material is the same as described above, detailed descriptions thereof will be omitted, and the remaining configurations will be only described in detail below.

The positive electrode active material may be included in an amount of 80 parts by weight to 99 parts by weight, for example, 85 parts by weight to 98.5 parts by weight based on 100 parts by weight of a total weight of the positive electrode active material layer. When the positive electrode active material is included in an amount within the above range, excellent capacity characteristics may be obtained.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 part by weight to 15 parts by weight based on 100 parts by weight of the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 part by weight to 15 parts by weight based on 100 parts by weight of the total weight of the positive electrode active material layer.

The positive electrode of the present disclosure may be prepared according to a typical method of preparing a positive electrode except that the above-described positive electrode active material is used. Specifically, a positive electrode material mixture, which is prepared by dissolving or dispersing the positive electrode active material as well as selectively the binder and/or the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of a slurry and manufacturing yield.

Also, as another method, the positive electrode may be prepared by casting the positive electrode material mixture on a separate support and then laminating a film separated from the support on the positive electrode collector.

Lithium Secondary Battery

Also, the present disclosure may prepare an electrochemical device including the positive electrode. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Furthermore, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of anegativeelectrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to a negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undopedwith lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 parts by weight to 99 parts by weight based on based on 100 parts by weight of a total weight of the negative electrode active material layer.

The binder is a component that assists in the binding between the conductive agent, the active material, and the current collector, wherein the binder is typically added in an amount of 0.1 part by weight to 10 parts by weight based on 100 parts by weight of the total weight of the negative electrode active material layer. Examples of the binder may bepolyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 parts by weight or less, for example, 5 parts by weight or less based on 100 parts by weight of the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used during the preparation of a lithium secondary battery, but the electrolyte is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon groupand may include a double-bond aromatic ring or ether bond); amides such as dimethylformamide; dioxolanes such as 1,3-dioxolane; or sulfolanesmay be used as the organic solvent. Among these solvents, the carbonate-based solvent is preferable, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present disclosure stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in detail, according to specific examples. The present disclosure may, however, be embodied in many different forms and thus this present disclosure should not be construed as being limited to the embodiments set forth herein.

EXAMPLES

Example 1

$NiSO_4$, $CoSO_4$, $MnSO_4$, $AlCl_3$, $MgCl_2$, $TiCl_4$, and $LaCl_3$ were dissolved in ion exchange water in amounts such that a molar ratio of nickel:cobalt:manganese:aluminum:magnesium:lanthanum:titanium was 8:1:1:0.03:0.004:0.004:0.002 to prepare a 0.01 M transition metal aqueous solution.

A container containing the transition metal powder aqueous solution was connected to a 10 L batch-type reactor set at 50° C. In addition, a 0.2 M aqueous ammonium solution and a 0.1% sodium hydroxide aqueous solution were prepared and connected to the batch-type reactor, respectively. 1 L of deionized water was put in the reactor, the reactor was then purged with nitrogen gas at a rate of 10 L/min to remove dissolved oxygen in the water, and a non-oxidizing atmosphere was created in the reactor.

Thereafter, the transition metal aqueous solution, the sodium hydroxide aqueous solution, and the aqueous ammonium solution were respectively added at rates of 100 mL/min, 50 mL/min, and 100 mL/min and subjected to a co-precipitation reaction for 5 hours to precipitate particles of a transition metal hydroxide. The precipitated particles of the transition metal hydroxide were separated, washed, and then dried at 80° C. for 3 hours to prepare a positive electrode active material precursor.

The above-prepared positive electrode active material precursor and LiOH were mixed so that a molar ratio of metal (Me):lithium (Li) was 1:1.05, and the mixture was sintered at 1,000° C. for 5 hours in an oxygen atmosphere to prepare a positive electrode active material.

Example 2

A positive electrode active material was prepared in the same manner as in Example 1 except that $NiSO_4$, $CoSO_4$, $MnSO_4$, $AlCl_3$, and $MgCl_2$ were dissolved in ion exchange water in amounts such that a molar ratio of nickel:cobalt:manganese:aluminum:magnesium was 8:1:1:0.03:0.004 to prepare a transition metal aqueous solution and the transition metal aqueous solution was used.

Example 3

A positive electrode active material was prepared in the same manner as in Example 1 except that $NiSO_4$, $CoSO_4$, $MnSO_4$, $AlCl_3$, and $LaCl_3$ were dissolved in ion exchange water in amounts such that a molar ratio of nickel:cobalt:manganese:aluminum:lanthanum was 8:1:1:0.03:0.002 to prepare a transition metal aqueous solution and the transition metal aqueous solution was used.

Example 4

A positive electrode active material was prepared in the same manner as in Example 1 except that $NiSO_4$, $CoSO_4$, $MnSO_4$, $AlCl_3$, and $TiCl_4$ were dissolved in ion exchange water in amounts such that a molar ratio of nickel:cobalt:manganese:aluminum:titanium was 8:1:1:0.03:0.004 to prepare a transition metal aqueous solution and the transition metal aqueous solution was used.

Example 5

A positive electrode active material was prepared in the same manner as in Example 1 except that $NiSO_4$, $CoSO_4$, $MnSO_4$, $AlCl_3$, $MgCl_2$, and $LaCl_3$ were dissolved in ion exchange water in amounts such that a molar ratio of nickel:cobalt:manganese:aluminum:magnesium:lanthanum was 8:1:1:0.03:0.004:0.002 to prepare a transition metal aqueous solution and the transition metal aqueous solution was used.

Example 6

A positive electrode active material was prepared in the same manner as in Example 1 except that $NiSO_4$, $CoSO_4$, $MnSO_4$, $AlCl_3$, $MgCl_2$, and $TiCl_4$ were dissolved in ion exchange water in amounts such that a molar ratio of nickel:cobalt:manganese:aluminum:magnesium:titanium was 8:1:1:0.03:0.004:0.004 to prepare a transition metal aqueous solution and the transition metal aqueous solution was used.

Example 7

A positive electrode active material was prepared in the same manner as in Example 1 except that $NiSO_4$, $CoSO_4$, $MnSO_4$, $AlCl_3$, $TiCl_4$, and $LaCl_3$ were dissolved in ion exchange water in amounts such that a molar ratio of nickel:cobalt:manganese:aluminum:titanium:lanthanum was 8:1:1:0.03:0.004:0.002 to prepare a transition metal aqueous solution and the transition metal aqueous solution was used.

Comparative Example 1

A positive electrode active material was prepared in the same manner as in Example 1 except that $NiSO_4$, $CoSO_4$, and $MnSO_4$ were dissolved in ion exchange water in amounts such that a molar ratio of nickel:cobalt:manganese was 8:1:1 to prepare a transition metal aqueous solution and the transition metal aqueous solution was used.

Comparative Example 2

A positive electrode active material was prepared in the same manner as in Example 1 except that $NiSO_4$, $CoSO_4$, $MnSO_4$, and $AlCl_3$ were dissolved in ion exchange water in amounts such that a molar ratio of nickel:cobalt:manganese:aluminum was 8:1:1:0.03 to prepare a transition metal aqueous solution and the transition metal aqueous solution was used.

Comparative Example 3

A positive electrode active material was prepared in the same manner as in Example 1 except that $NiSO_4$, $CoSO_4$, $MnSO_4$, $MgCl_2$, $TiCl_4$, and $LaCl_3$ were dissolved in ion exchange water in amounts such that a molar ratio of nickel:cobalt:manganese:magnesium:lanthanum:titanium was 8:1:1:0.004:0.004:0.002 to prepare a transition metal aqueous solution and the transition metal aqueous solution was used.

Comparative Example 4

A positive electrode active material was prepared in the same manner as in Example 1 except that $NiSO_4$, $CoSO_4$, $MnSO_4$, $AlCl_3$, $MgCl_2$, $TiCl_4$, and $LaCl_3$ were dissolved in ion exchange water in amounts such that a molar ratio of nickel:cobalt:manganese:aluminum:magnesium:lanthanum:titanium was 8:1:1:0.01:0.01:0.01:0.01 to prepare a 0.01 M transition metal aqueous solution and the transition metal aqueous solution was used.

Experimental Example 1: Moisture Absorption Amount Measurement

Moisture absorption amounts of the positive electrode active materials prepared in Examples 1 to 7 and Comparative Examples 1 to 4 were evaluated.

Specifically, the positive electrode active materials prepared in Examples 1 to 7 and Comparative Examples 1 to 4 were left standing in the air under the same condition including a humidity of 60% and a temperature of 25° C., and moisture contents of each positive electrode active material immediately after the preparation of the positive electrode active material and after 24 hours passed after the positive electrode active material was left standing were analyzed by a moisture absorption measuring instrument (Karl Fischer water determination, Mettler Toledo GmbH, Germany), and the results thereof are presented in Table 1 below.

TABLE 1

|  | Immediately after the preparation (ppm) | After moisture absorption (ppm) |
|---|---|---|
| Example 1 | 181 | 584 |
| Example 2 | 175 | 654 |
| Example 3 | 173 | 666 |
| Example 4 | 180 | 589 |
| Example 5 | 168 | 595 |
| Example 6 | 183 | 640 |
| Example 7 | 166 | 598 |
| Comparative Example 1 | 167 | 994 |
| Comparative Example 2 | 147 | 664 |
| Comparative Example 3 | 168 | 1004 |
| Comparative Example 4 | 170 | 764 |

As illustrated in Table 1, it may be confirmed that the moisture absorption amounts of the positive electrode active materials prepared in Examples 1 to 7 were greater than or equal to the moisture absorption amount of the positive electrode active material in which Al was only doped as in Comparative Example 2. Particularly, it may be confirmed that the moisture absorption amounts were significantly improved in comparison to a case where Al was not included as a doping element as in Comparative Examples 1, 3, and 4.

Experimental Example 2: Residual Lithium Measurement

A pH titration was performed by using a pH meter (Metrohm AG, Switzerland) as a pH meter, to measure an amount of residual lithium present on each surface of the positive electrode active materials prepared in Examples 1 to 6 and Comparative Examples 1, 2, and 4. Specifically, 10 g of each of the positive electrode active material powders prepared in Examples 1 to 7 and Comparative Examples 1 to 4 and 100 mL of distilled water were stirred. The pH titration was performed while a 0.1 N HCl solution was added to the solution.

A pH titration was performed immediately after the preparation of the positive electrode active material, and an amount of residual lithium on the surface of the positive electrode active material in this case was recorded. Subsequently, after the positive electrode active material was left standing for 24 hours at 25° C. and a RH of 60% after the preparation, a pH titration was performed, and an amount of residual lithium on the surface of the positive electrode active material in this case was recorded. The results thereof are presented in Table 2 below.

TABLE 2

|  | Immediately after the preparation | | After moisture absorption | | |
|---|---|---|---|---|---|
|  | LiOH (wt %) | $Li_2CO_3$ (wt %) | LiOH (wt %) | $Li_2CO_3$ (wt %) | A1/A0 |
| Example 1 | 0.42 | 0.12 | 0.22 | 0.15 | 1.25 |
| Example 2 | 0.43 | 0.11 | 0.27 | 0.17 | 1.55 |
| Example 3 | 0.45 | 0.10 | 0.30 | 0.18 | 1.80 |
| Example 4 | 0.39 | 0.10 | 0.28 | 0.16 | 1.60 |
| Example 5 | 0.41 | 0.11 | 0.31 | 0.17 | 1.55 |
| Example 6 | 0.42 | 0.10 | 0.29 | 0.15 | 1.50 |

TABLE 2-continued

|  | Immediately after the preparation | | After moisture absorption | | |
|---|---|---|---|---|---|
|  | LiOH (wt %) | $Li_2CO_3$ (wt %) | LiOH (wt %) | $Li_2CO_3$ (wt %) | A1/A0 |
| Comparative Example 1 | 0.43 | 0.10 | 0.40 | 0.21 | 2.10 |
| Comparative Example 2 | 0.36 | 0.10 | 0.33 | 0.17 | 1.70 |
| Comparative Example 4 | 0.41 | 0.11 | 0.30 | 0.21 | 1.91 |

As illustrated in Table 2, with respect to the positive electrode active materials prepared in Examples 1 to 6 and Comparative Example 2, it may be confirmed that amounts of lithium carbonate formed after the moisture absorption were reduced in comparison to that of the positive electrode active material prepared in Comparative Example 1.

With respect to the positive electrode active material prepared in Comparative Example 4, it may be confirmed that, since Al was not included as a doping element, an amount of lithium carbonate formed after the moisture absorption was greater than those of Examples 1 to 6 and Comparative Example 2 which included Al.

Experimental Example 3: Capacity Measurement

Lithium secondary batteries were prepared by using the positive electrode active materials prepared in Examples 1 to 3 and 5 and Comparative Examples 1 to 4, and capacity characteristics of each secondary battery were then compared.

In this case, the secondary batteries were prepared in the same manner as described below except that the positive electrode active materials respectively prepared in Examples 1 to 3 and 5 and Comparative Examples 1 to 4 were used. Specifically, each of the positive electrode active materials prepared in Examples 1 to 3 and 5 and Comparative Examples 1 to 4, a carbon black conductive agent, and a polyvinylidene fluoride binder were mixed in a weight ratio of 97:1:2 and then mixed in a N-methylpyrrolidone solvent to prepare a composition for forming a positive electrode. An 8 μm thick aluminum current collector was coated with the composition for forming a positive electrode, dried, and then roll-pressed to prepare a positive electrode. Subsequently, artificial graphite as a negative electrode active material, a carbon black conductive agent, and carboxymethyl cellulose and a styrene-butadiene rubber, as a binder, were mixed in a weight ratio of 95:1:1:3 and added to pure water, as a solvent, to prepare a negative electrode active material slurry. A 15 μm thick copper current collector was coated with the negative electrode active material slurry, dried, and then roll-pressed to prepare a negative electrode. After the above-prepared positive electrode and negative electrode were stacked with a polypropylene/polyethylene separator to prepare a polymer type battery by a conventional method, it was put in a battery case, and an electrolyte solution, in which 1 M $LiPF_6$ was dissolved in a mixed solvent in which ethylene carbonate, diethyl carbonate, and dimethyl carbonate were mixed, was injected thereinto to prepare each lithium secondary battery according to Examples 1 to 3 and 5 and Comparative Examples 1 to 4.

Each of the lithium secondary batteries prepared in Examples 1 to 3 and 5 and Comparative Examples 1 to 4 was charged at a constant current of 0.2 C to 4.25 V at 25° C. and cut-off charged at 0.005 C. Thereafter, each lithium secondary battery was discharged at a constant current of 0.2 C to a voltage of 2.5 V, and discharge capacity in this case was measured. Subsequently, the secondary batteries prepared in Examples 1 to 3 and 5 and Comparative Examples 1 to 4, which were thus obtained, were left standing for 24 hours at 25° C. and a RH of 60% to prepare moisture absorbed samples, and capacity after the moisture absorption was measured. The secondary batteries immediately after the preparation were separately prepared to measure capacity immediately after the preparation, and the results thereof are presented in Table 3 below.

TABLE 3

|  | Capacity immediately after the preparation (mAh/g) | Capacity after moisture absorption (mAh/g) |
|---|---|---|
| Example 1 | 208.2 | 206.8 |
| Example 2 | 208.3 | 206.5 |
| Example 3 | 207.5 | 205.0 |
| Example 5 | 208.3 | 206.1 |
| Comparative Example 1 | 209.3 | 204.5 |
| Comparative Example 2 | 207.7 | 205.8 |
| Comparative Example 3 | 208.1 | 206.4 |
| Comparative Example 4 | 208.0 | 206.1 |

As illustrated in Table 3, it may be confirmed that capacity characteristics after the moisture absorption of the secondary batteries of Examples 1 to 3 and 5 were higher than those of Comparative Examples 1 which did not include a doping element. It may be confirmed that the secondary batteries of Examples 1 to 3 and 5 including additional doping elements as well as Al exhibited better capacities after the moisture absorption than Comparative Example 2 in which Al was only doped as a doping element.

The invention claimed is:

1. A positive electrode active material comprising a nickel-cobalt-manganese-based lithium transition metal oxide which contains nickel in an amount of 60 mol % or more based on a total number of moles of metals excluding lithium,
   wherein the nickel-cobalt-manganese-based lithium transition metal oxide is doped with doping element $M^1$ and doping element $M^2$,
   the nickel-cobalt-manganese-based lithium transition metal oxide comprises the doping element $M^1$ in an amount of 100 ppm to 10,000 ppm, and
   the doping element $M^1$ and the doping element $M^2$ are included in a weight ratio ($M^1:M^2$) of 50:50 to 99:1, and
   the nickel-cobalt-manganese-based lithium transition metal oxide is represented by Formula 1:

$$Li_{1+a}[Ni_xCo_yMn_zM^1_wM^2_v]O_2 \qquad \text{[Formula 1]}$$

wherein, in Formula 1,
$M^1$ is a metallic element including Al,
$M^2$ is a metallic element including Mg and Ti, and
$0 \leq a \leq 0.3$, $0.60 \leq x < 1$, $0 < y < 0.35$, $0 < z < 0.35$, $0 < w \leq 0.01$, and $0 < v \leq 0.005$.

2. The positive electrode active material of claim 1, wherein doping element $M^2$ further includes at least one of La, Zn, B, W, Fe, Cr, V, Ru, Cu, Cd, Ag, Y, Sc, Ga, In, As, Sb, Pt, Au, and S.

3. The positive electrode active material of claim 2, wherein, in Formula 1, $w \geq v$, and $1 \leq w/v \leq 15$.

4. The positive electrode active material of claim 1, wherein the positive electrode active material satisfies Equation 1:

$$1.0 \leq (A1/A0) \leq 1.8 \qquad \text{[Equation 1]}$$

wherein A1 is an amount of lithium carbonate present on a surface of the positive electrode active material which is measured after the positive electrode active material is left standing for 1 day in an environment with a relative humidity (RH) of 60% and a temperature of 25° C., and A0 is an initial amount of lithium carbonate present on the surface of the positive electrode active material which is measured before the positive electrode active material is left standing.

5. The positive electrode active material of claim 1, wherein a total amount of a lithium by-product including at least one of lithium hydroxide and lithium carbonate, which is present on the surface of the positive electrode active material after the positive electrode active material is left standing for 1 day in the environment with a relative humidity (RH) of 60% and a temperature of 25° C., is 0.5 part by weight or less based on 100 parts by weight of a total weight of the positive electrode active material.

6. The positive electrode active material of claim 1, wherein the positive electrode active material has an average particle diameter ($D_{50}$) of 8 μm to 15 μm.

7. A positive electrode comprising a positive electrode collector, and a positive electrode active material layer formed on the positive electrode collector,
   wherein the positive electrode active material layer comprises the positive electrode active material of claim 1.

8. A lithium secondary battery comprising the positive electrode of claim 7.

* * * * *